United States Patent [19]
Kudou et al.

[11] Patent Number: 6,067,954
[45] Date of Patent: May 30, 2000

[54] DIRECT FUEL INJECTION ENGINE

[75] Inventors: Hidetoshi Kudou, Higashi-Hiroshima; Noriyuki Ota, Hiroshima; Masashi Marubara, Hiroshima; Hiroyuki Yamashita, Hiroshima, all of Japan

[73] Assignee: Mazda Motor Corporation, Hiroshima-ken, Japan

[21] Appl. No.: 09/162,498

[22] Filed: Sep. 29, 1998

[30] Foreign Application Priority Data

Sep. 29, 1997 [JP] Japan ................................ 9-264463
Sep. 7, 1998 [JP] Japan ................................ 10-253045

[51] Int. Cl.$^7$ .................................................. F02D 41/02
[52] U.S. Cl. ......................... 123/299; 123/295; 123/300; 123/478
[58] Field of Search .................... 123/299, 295, 123/298, 300, 305, 430, 478, 480

[56] References Cited

U.S. PATENT DOCUMENTS

| | | | |
|---|---|---|---|
| 4,621,599 | 11/1986 | Igashira et al. | 123/300 |
| 5,078,107 | 1/1992 | Morikawa | 123/299 |
| 5,154,152 | 10/1992 | Yamane et al. | 123/493 |

FOREIGN PATENT DOCUMENTS

| | | | |
|---|---|---|---|
| 0785346 | 7/1997 | European Pat. Off. | F02B 17/00 |
| 7-119507 | 5/1995 | Japan | F02D 41/02 |

*Primary Examiner*—Willis R. Wolfe
*Assistant Examiner*—Hieu T. Vo
*Attorney, Agent, or Firm*—Sidley & Austin; Hugh A. Abrams

[57] ABSTRACT

A direct injection engine including an injector disposed in an upper portion of a combustion chamber defined above a piston disposed in a cylinder of the engine with a fuel injecting direction of the injector being provided so that a fuel being injected toward a top portion of the piston, an ignition plug disposed at an upper portion of the combustion chamber, an engine operating condition detector for detecting an engine operating condition. The fuel is injected in a compression stroke from the injector when it is detected by the engine operating condition detector that the engine is in a low engine load and speed zone so as to stratify an injected air fuel mixture around the ignition plug to accomplish a stratified combustion. The engine further includes a fuel controller for controlling an fuel injection so as to inject the fuel plural times into the combustion chamber in a compression stroke when at least one of an engine load and an engine speed is relatively high in an engine operating zone for accomplishing the stratified combustion. A stable combustion is accomplished to improve the fuel consumption efficiency.

23 Claims, 13 Drawing Sheets

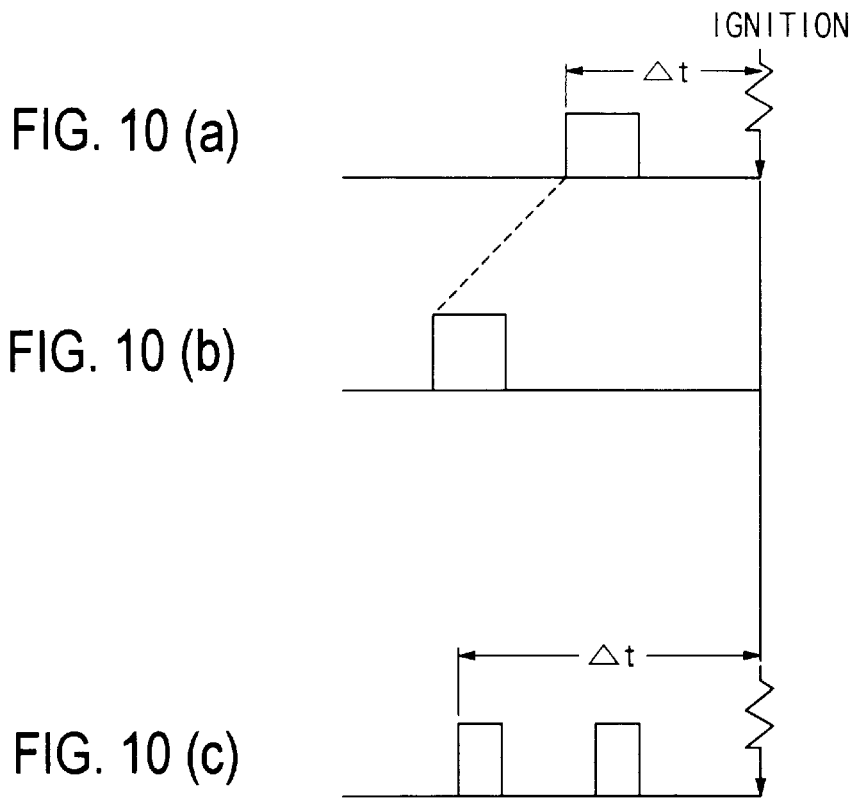
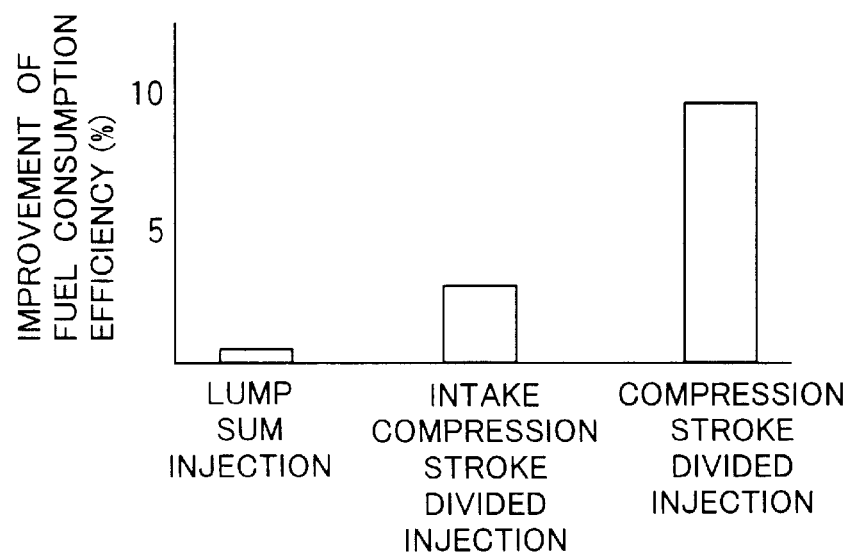

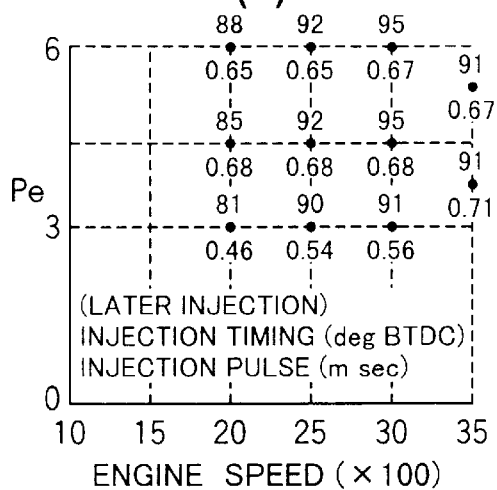
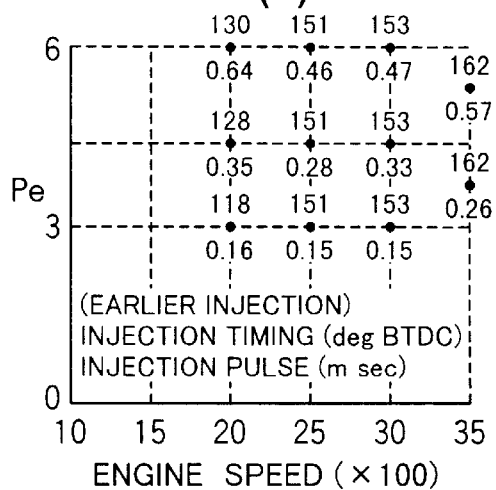
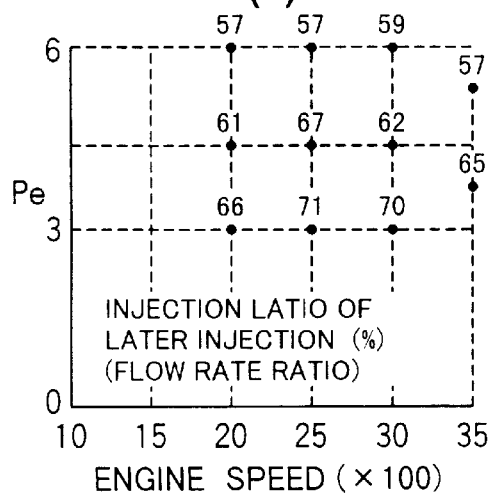
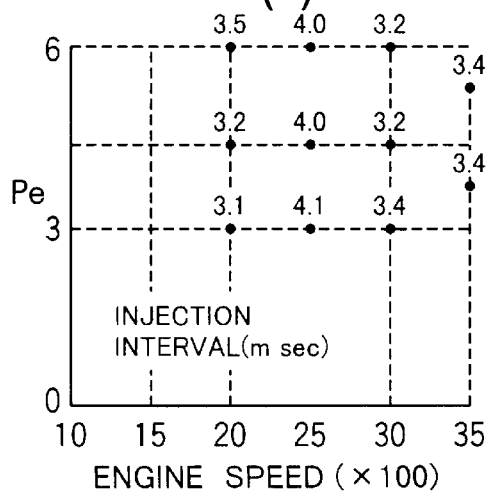

DIRECT FUEL INJECTION ENGINE

BACKGROUND OF THE INVENTION

1. Field of the Invention

The present invention relates to a direct fuel injection engine comprising a fuel injector which injects a fuel directly into an engine combustion chamber.

2. Related Art

Conventionally, as shown in Japanese Patent Un-examined Application Publication No.7-119507, in a direct fuel injection ignition engine in which the fuel injection is started at a later stage of a compression stroke in a low engine load condition to implement a stratified combustion, whereas the fuel injection is started at an earlier stage of an intake stroke in a high engine load and low engine speed condition to implement a uniform combustion, the fuel injection is executed several times by dividing a fuel amount to be injected so as to reduce the fuel amount of an single injection performance and facilitate the diffusion and atomization of the injected fuel to thereby accomplish a uniform combustion condition while suppressing an undesirable smoke production.

In the engine as described in the publication, in the high engine load and low engine load condition, the fuel is injected plural times by dividing the total fuel amount to facilitate the uniform combustion to thereby prevent the smoke production in the exhaust gas. There is a desire to improve a fuel consumption efficiency in the case where the fuel is injected in the compression stroke in order to accomplish a stratified combustion when the engine operation is in a low engine load and speed condition.

In this case, in a relatively high engine load condition in which a stratified combustion is still desirable, the fuel amount is increased so that the injected fuel is excessively concentrated around the ignition plug to deteriorate the mixing effect with air and thus deteriorate the combustion efficiency. In another aspect, in a relatively high engine speed condition within a stratified combustion operating zone, a time period from the fuel injection to the ignition timing is reduced. As a result, an enough time period for atomizing the fuel cannot be obtained to cause incomplete combustion to increase the amount of CO and HC in the exhaust gas.

In order to obtain an enough time to provide an improved mixing effect of fuel and air and to vaporize and atomize the injected fuel, it is proposed to advance the injection timing. However, if this is made, the fuel would be injected before the piston is stroked up to a proper level so that the injected fuel is not properly caught by a cavity formed on a top surface of the piston. As a result, the air fuel mixture gets lightened to deteriorate a combustion stability. In order to deal with the above problem, conventionally, the stratified combustion condition is limited. Thus, the fuel consumption cannot be properly improved.

In the engine as disclosed in the publication, the fuel injection is divided to be executed in the intake stroke and the compression stroke in a medium engine load operating condition to avoid an excessive fuel concentration around the ignition plug and to facilitate the vaporization and atomization of the injected fuel in the intake stroke before the ignition timing. However, where the fuel is injected in the intake stroke, the injected fuel tends to be excessively dispersed and to be lightened. As a result, the combustion efficiency is deteriorated.

In view of this, it is proposed that the fuel injection amount is increased to prevent the injected fuel from being undesirably lightened. If this is made, however, the fuel amount injected in the compression stroke is unavoidably reduced and thus the mixture around the ignition plug is lightened to deteriorate the combustion stability.

SUMMARY OF THE INVENTION

Therefore, an object of the invention is to provide a direct injection engine which can improve a combustion efficiency and thus improve the fuel consumption efficiency without deteriorating the combustion stability.

The above and other objects of the present invention can be accomplished by a direct injection engine comprising, an injector disposed in an upper portion of a combustion chamber defined above a piston disposed in a cylinder of the engine with a fuel injecting direction of the injector being provided so that a fuel being injected toward a top portion of the piston, an ignition plug at an upper portion of the combustion chamber, engine operating condition detector for detecting an engine operating condition, the fuel being injected in a compression stroke from the injector when it is detected by the engine operating condition detector that the engine is in a low engine load and speed condition so as to stratify an injected air fuel mixture around the ignition plug to accomplish a stratified combustion, and a fuel control means for controlling an fuel injection so as to inject the fuel into the combustion chamber plural times in a compression stroke when at least one of an engine load and an engine speed is relatively high in an engine operating condition for the stratified combustion. According to the above feature, the fuel injection is made plural times in the compression stroke in a relatively high engine load or engine speed condition in the low engine load and speed condition in which the stratified combustion is to be accomplished. As a result, the injected fuel is introduced around the ignition plug due to the fact that the fuel is reflected on the top portion of the piston and influenced by a gas flow in the combustion chamber above the piston. Namely, an excessive concentration of the injected fuel around the ignition plug is effectively prevented. In addition, an enough time can be properly obtained for vaporizing and atomizing an earlier injected fuel so that it is possible to form a stratified layer around the ignition plug to accomplish a stratified condition. As a result, an engine operating zone for accomplishing the stratified combustion can be properly expanded to thereby improve the fuel consumption efficiency.

In this case, the fuel control means controls the fuel injection so that the fuel is injected plural times in the compression stroke when the engine load and speed are relatively high in a stratified operation zone in which the fuel injection is executed to accomplish the stratified combustion. As a result, the excessive fuel concentration around the ignition plug can be avoided.

In another aspect of the invention, the injector is so disposed that the fuel is injected obliquely downwardly from a peripheral portion of the combustion chamber in executing the fuel injection plural times in the compression stroke. The cavity is formed on the top surface of the piston so that the fuel is injected toward the cavity. According to this feature, the fuel is obliquely and downwardly injected toward the cavity from the injector disposed at the peripheral portion of the combustion chamber. The injected fuel is effectively introduced around the ignition plug by virtue of the cavity. The stratified condition is properly accomplished around the ignition plug. According to another aspect of the invention, in executing the divided fuel injection, respective fuel injection timings are determined so that a fuel injection area of an earlier fuel injection is overlapped with that of a later fuel injection from in the cavity which is disposed opposite to the ignition plug.

According to this feature, the earlier injected fuel is effectively overlapped with the later injected fuel in the cavity to facilitate the stratification of the mixture around the ignition plug. As a result, the injected fuel can be continuously and stably combusted.

According to further aspect of the invention, the engine is provided for forming an inclined vortex including a tumble component and swirl component produced in the combustion chamber. In executing the divided fuel injection in the compression stroke, the injection timing is so determined that the later injected fuel is properly caught by the cavity formed on the top of the piston. According to this feature, the later injected fuel is properly mixed with the intake gas by virtue of the inclined vortex of the gas flow in the combustion chamber and introduced around the ignition plug to improve an ignition stability.

In another feature of the invention, in an operating condition in which the fuel injection is executed in the compression stroke, the divided fuel injection is made in the high engine load condition and a lump sum or single fuel injection is made in the low engine load condition. In addition, a later fuel injection start timing in the divided fuel injection is determined to correspond to the fuel injection start timing in the case of the lump sum injection in substantially the same engine speed condition.

According to this feature, in the operating condition in which the fuel injection is executed in the compression stroke, the later fuel injection of the divided fuel injection is made based on the fuel injection timing determined as the optimized one for stratifying the fuel in accordance with the engine speed.

In further aspect of the invention, in the operating condition in which the divided fuel injection is executed in the compression stroke and where the engine is in the relatively high engine load and speed, a fuel injection pressure is increased compared with a relatively low engine load and speed. With this feature, the fuel injection is executed with an increased pressure when the engine operating condition is in the relatively high engine load and speed. As a result, a time period of the fuel injection is reduced.

In another feature of the invention, in the operating condition in which the divided fuel injection is executed in the compression stroke and where the engine is in an accelerated condition, an earlier fuel injection timing is advanced compared with a usual operating condition. In addition, the fuel injection amount thereof is greater than the later fuel injection amount.

In further aspect of the invention, the later fuel injection amount is determined to be approximately 30–80% of a total fuel injection amount in the engine operating zone in which the divided fuel injection is executed in the compression stroke.

According to this feature, the fuel injection amount is properly set in the respective injections of the divided injection to properly stratify the injected fuel to thereby improve the fuel consumption efficiency. The ignition stability is also improved.

In another feature of the invention, the later fuel injection amount is not smaller than the earlier fuel injection amount at least in a relatively low engine load zone in the engine operating zone in which the divided fuel injection is executed in the compression stroke. According to this feature, a sufficient amount of the later fuel injection is reserved while the air fuel mixture is concentrated around the ignition plug in an operating condition in which the fuel injection amount is relatively small. The ratio of the earlier fuel injection amount and the later fuel injection amount is adjusted in order to improve the fuel consumption efficiency.

According to another feature of the invention, in the operating condition in which the divided fuel injection is executed in the compression stroke and where the exhaust gas as EGR gas is recirculated from an exhaust system to intake system, the later fuel injection amount is approximately 50–80% of the total injection amount. According to this feature, the injected fuel is heated by the EGR gas so that the injected fuel is facilitated to be vaporized and atomized. Thus, it is possible to increase the later fuel injection amount without deteriorating the vaporization and the atomization of the fuel to accomplish the combustion stability and the improved fuel consumption efficiency. The later fuel injection amount is not smaller than the earlier fuel injection amount in at least the relatively low engine load condition in the stratified operation zone.

In another feature of invention, when the divided fuel injection is executed in the compression stroke, the ratio of the earlier fuel injection amount to the later fuel injection amount is changed in accordance with the operating condition.

In another feature of the invention, where the divided fuel injection is executed, as the engine load is increased, the earlier fuel injection amount is increased. In this case, the total fuel injection amount is controlled to match the engine load. As a result, it is prevented that the later fuel injection amount becomes over rich around the ignition plug. Thus, an appropriate stratified condition is maintained.

In another feature of the invention, the earlier fuel injection start timing is advanced and the earlier fuel injection amount is increased compared with a relatively low engine load or low engine speed zone when the engine operating condition is in a relatively high engine load and speed zone in the engine operating zone in which the divided fuel injection is executed in the compression stroke.

In another feature of the present invention, the start timings of the earlier and later fuel injections are advanced as the engine load is increased when the engine is at least in a relatively low engine speed zone in the engine operating condition in which the divided fuel injection is executed in the compression stroke.

According to the above feature, as the fuel injection amount is increased when the engine load is increased, the injected fuel is dispersed properly and it is prevented that the gas mixture becomes overly rich. In further feature of the present invention, where the divided fuel injection is executed in the compression stroke, the start timings of the earlier fuel injection and later fuel injection are advanced as the engine speed is increased. According to the above feature, the fuel injection start timings are controlled to keep a interval period from the fuel injection start timings to the ignition timing properly even when the engine speed is increased so that it is prevented that the injected fuel is excessively concentrated in a central portion of the combustion chamber in a high engine speed zone in the stratified operating condition.

In this case, an advancement of the injection timing in accordance with the engine speed for the earlier fuel injection is greater than the later fuel injection. According to the above feature, even when the engine speed is increased, the interval to the ignition timing is maintained properly. In addition, the interval from the earlier injection and the later injection is properly maintained as well.

In still another aspect of the invention, the advancement in the injection timing of the earlier fuel injection based on an increase of the engine load or the engine speed is limited where the engine is in a relatively high engine load and speed zone in the operating zone in which the divided injection is executed in the compression stroke.

According to the above feature, in the relatively high engine load and speed in the stratified operating zone, it is prevented that the earlier injected fuel is overly dispersed. As a result, the stratified condition is properly maintained.

In another aspect of the invention, in the operating zone in which the divided injection is executed in the compression stroke and the engine is in a relatively low engine speed zone in the stratified operating zone, the interval between the earlier fuel injection and the later fuel injection is increased as the engine load is increased.

According to the above feature, since the fuel injection start timing of the earlier fuel injection can be relatively largely advanced in a relatively low engine speed zone in the stratified operating zone, the interval between the two injections can be increased as the engine load is increased preventing an over rich gas mixture due to an excessive overlap of the injected fuels of the earlier and later injections.

According to another feature, in the operating zone in which the divided injection is executed in the compression stroke and the engine is in a relatively high engine speed zone in the stratified operating zone, the interval between the injection start timings of the earlier and later fuel injections is substantially constant regardless of the engine load change.

According to the above feature, since the fuel injection start timing of the earlier fuel injection cannot be relatively largely advanced in a relatively high engine speed zone in the stratified operating zone, the interval between the two injections is controlled so that the earlier injection timing is not excessively advanced.

In another feature of the present invention, in executing the divided fuel injection in the compression stroke, the interval between the earlier injection start timing and the later injection start timing is more than about 2 ms.

According to the above feature, an enough interval is obtained between the earlier injection start timing and the later injection start timing so that it is prevented that the gas mixture becomes overly rich due to the fact that the injected fuel of the two injections are excessively overlapped.

In further aspect of the present invention, in executing the divided fuel injection, the fuel injection time period is set within about 1 msec. According to the above feature of the invention, the injected fuel is properly vaporized and atomized without concentrating in a specific area in the combustion chamber.

In another feature of the invention, the fuel injection is executed plural times in the compression stroke in an operating zone in which at least one of the engine load and engine speed is relatively high in the stratified operating zone when the engine is in a warmed up condition. In addition, the fuel injection is executed plural times when the engine is in a warming up condition in a manner that the fuel injection is made in the intake stroke and the compression stroke respectively.

According to the above feature, in the engine warmed up condition, the fuel consumption efficiency is improved. While, in the warming up condition, an engine warm up is effectively facilitated.

Further objects, features and advantages of the present invention will become apparent from the Detailed Description of Preferred Embodiments which follows when read in light of the accompanying Figures.

BRIEF DESCRIPTION OF THE DRAWINGS

FIG. 10 is a graphical representation of the fuel injection for providing the property showing FIG. 9 wherein (a) is a lump sum injection at a timing providing the optimized fuel consumption efficiency in the compression stroke, (b) is a lump sum injection at an advanced timing in the compression stroke, and (c) is a divided fuel injection in which the fuel injection is made twice at timings providing the optimized fuel consumption efficiency in the compression stroke;

FIG. 11 is a graphical representation showing an improvement of the fuel consumption efficiency;

FIGS. 15(a), 15(b), 15(c) and 15(d) are diagrams in various operating conditions in an operating zone in which the divided fuel injection is executed wherein (a) shows the injection timing and pulse of the later injection, (b) shows the injection timing and pulse of the earlier injection (c) shows the later injection rate and (d) shows the injection intervals;

DETAILED DESCRIPTION OF THE PREFERRED EMBODIMENTS

Figure 1:
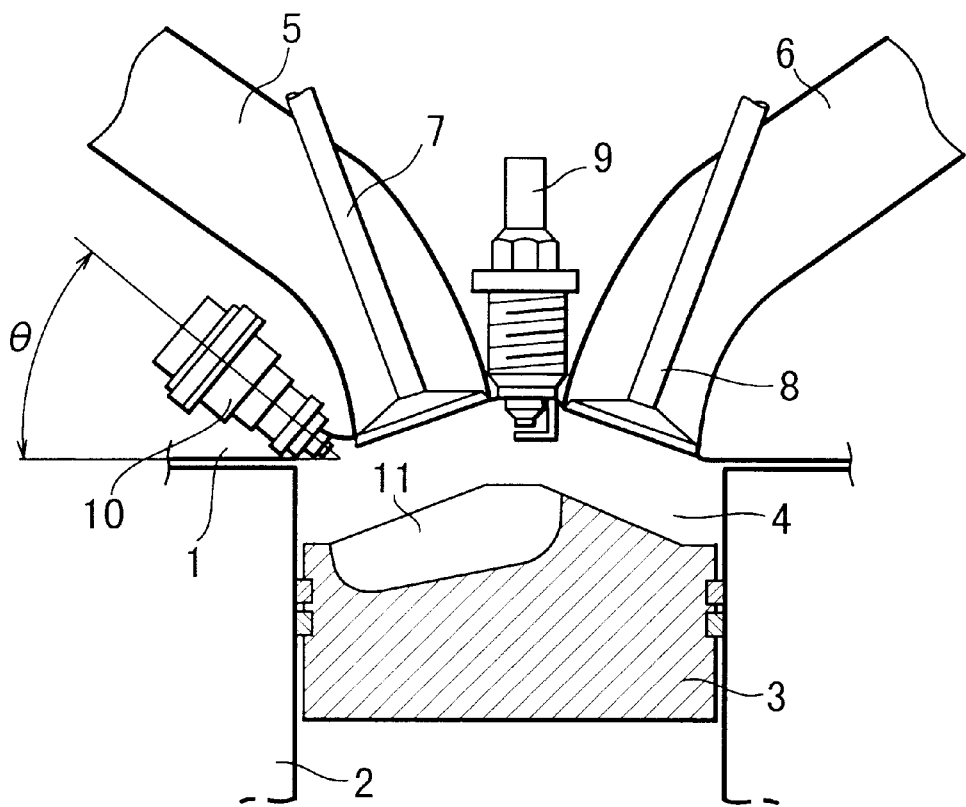
FIG. 1 is a sectional view of a direct injection engine body according to the present invention.
Figure 2:
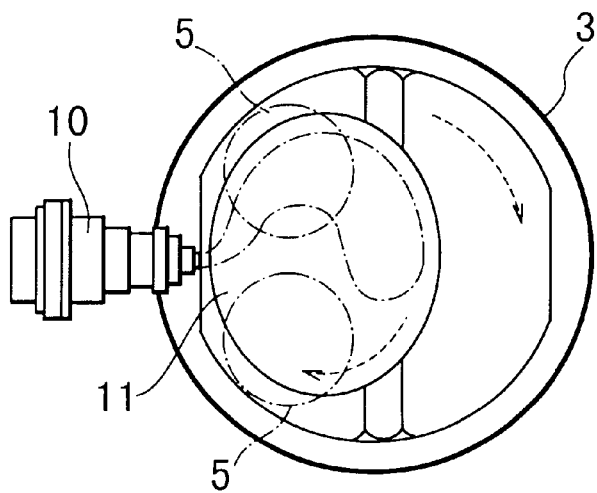
FIG. 2 is a plan view of a top of the piston.

Hereinafter, the present invention is described in detail taking reference with the attached drawings. FIGS. 1 and 2 show a structure of a combustion chamber of a direct injection engine, which is a gasoline engine and thus, distinguished from a diesel engine. The engine illustrated in FIG. 1 is provided with multiple cylinders, each of them including a cylinder head and a cylinder block 2. In the cylinders are disposed pistons 3 above which a combustion chamber 4 is defined. An intake port 5 and exhaust ports 6 are formed on the cylinder head 1 to communicate with the combustion chamber 4. An intake valve 7 and exhaust valve 8 for opening and closing the ports 5, 6, an ignition plug 9 for igniting a fuel and an injector 10 for injecting the fuel directly in the combustion chamber 4 are provided in the cylinder head 1.

The lower surface of the cylinder head 1 or ceiling of the combustion chamber 4 is of a pent roof type combustion chamber 4. The intake port 5 and exhaust port 6 are opened in the combustion chamber 4 at a slant surface of the pent roof recess of the cylinder head 1. The intake valve 7 and exhaust valve 8 are driven by a drive mechanism (not shown) to be opened and closed at predetermined timings.

In FIG. 1, each one of intake port 5 and exhaust port 6 are shown. There are also provided an intake port 5 and an exhaust port 6 in a direction perpendicular to a plane including FIG. 1. A control valve for controlling an intake gas flow is disposed in one of the intake ports 5. The control valve is driven by an actuator including a step motor and the like to close or open one of the ports 5. When the intake gas flow in the one of the ports 5 is restricted while that in the other of the ports is not restricted, a swirl (vortex of the intake gas flow in substantially a horizontal direction) is produced along the inner surface of the combustion chamber 4 as shown a broken line. The other of the intake ports 5 is formed to be extended obliquely downwardly at a downstream end portion thereof so that the intake gas flow therein produces a tumble (vortex of the intake gas flow in substantially a vertical direction). Accordingly, when the control valve is fully closed or partly opened, the tumble and the swirl are mixed to produce an inclined vortex in the combustion chamber 4.

The ignition plug 9 is disposed to be projected in a central portion of the chamber 4. The injector 10 is disposed at a peripheral portion 4 of the chamber at a side of the intake ports 5. The injecting direction of the injector 10 is determined to inject the fuel toward the top portion of the piston 3. An angle θ from the horizontal plane is set at a range of, for example, 20–50°, preferably 30–50°. Thus, the fuel is injected obliquely downwardly into the chamber 4.

The injector 10 is provided with a built-in needle valve and solenoid. When a solenoid receives a pulse signal from a fuel control device, the injector 10 injects the fuel by a pulse width indicated by the signal with an injection angle, for example, more than 40° and with an injecting pressure about 3–15 Pa.

The top surface of the piston 3 is partially recessed to form the cavity 11. The cavity 11 is formed in an area which extends from the peripheral portion close to the injector 10 to the central portion facing to the ignition plug 9. A relationship among the location and inclined angle of the injector 10, the cavity 11 of the piston 3 and the location of the ignition plug 9 are determined so that the injected fuel is caught by the cavity 11 to be brought around the ignition plug 9 as the piston 3 is lifted in the compression stroke.

Figure 3:
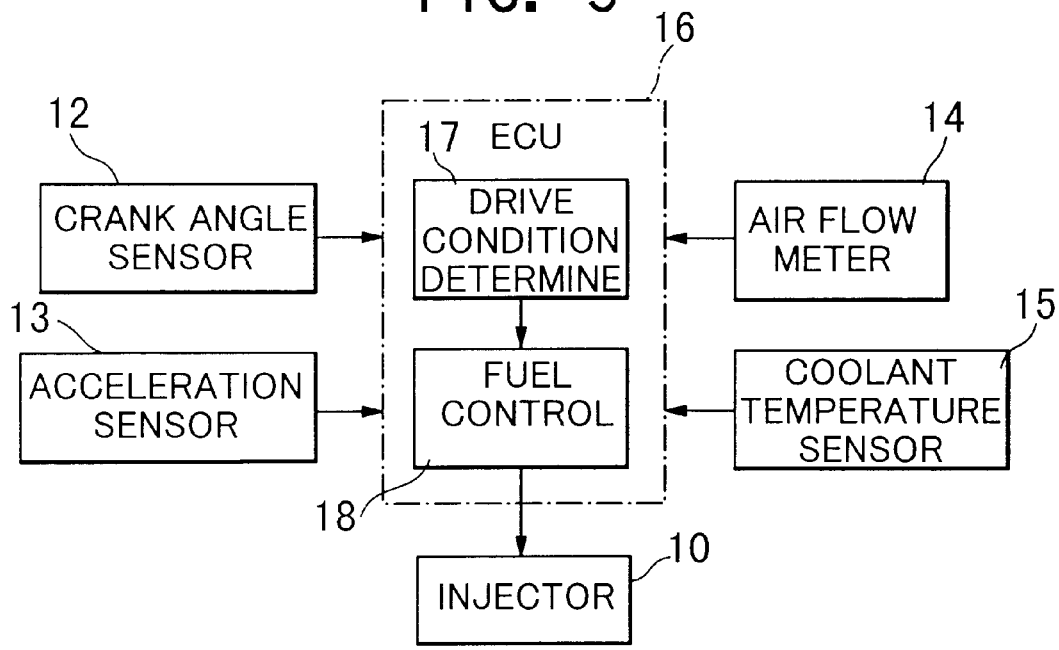
FIG. 3 is a block diagram showing a control system of the engine.

As shown in FIG. 3, the engine is provided with a crank angle sensor 12, acceleration sensor 13 for detecting acceleration opening or accelerator stroke, air-flow meter 14 for detecting an intake air amount, coolant sensor 15 for sensing an engine coolant temperature and the like. Signals from the sensors are entered to ECU (engine control unit) 16.

The ECU 16 includes an operating condition judge means 17 and a fuel injection controller 18 for controlling the fuel injection from the injector 10.

Figure 4:
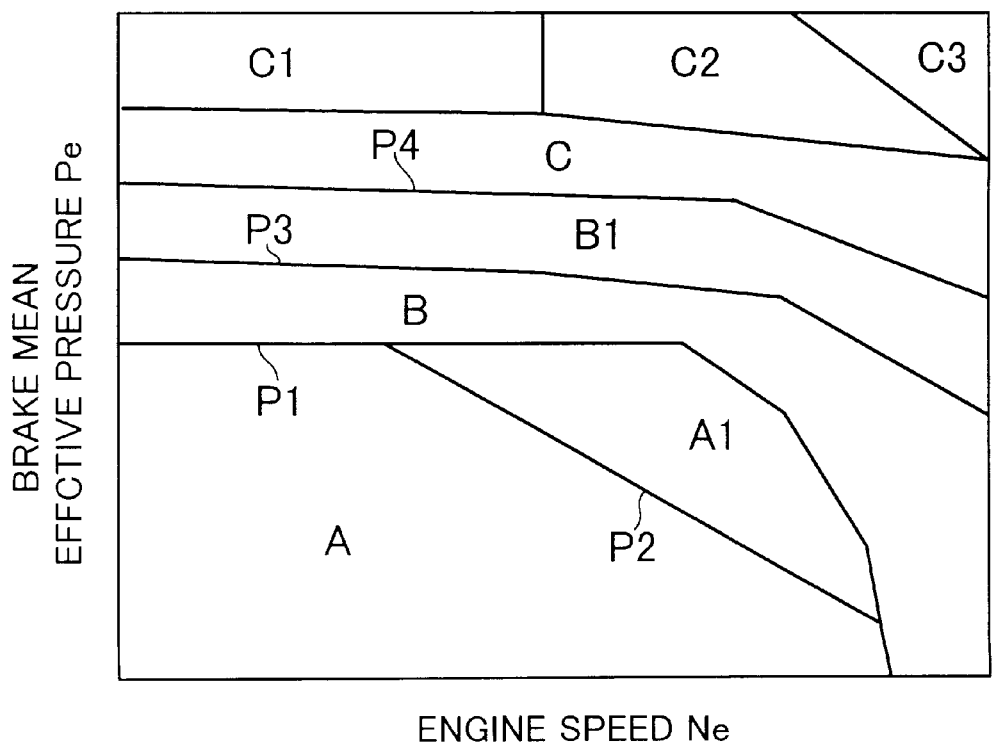
FIG. 4 is a control map showing an engine operating zone.

The operating condition judge means judges an engine operating zone to which an engine operation belongs in a map of the engine operating zone as shown in FIG. 4 and produces a resulted signal to the fuel controller 18. The operating zone is determined based on the engine speed Ne and a brake mean effective pressure Pe (an engine load equivalent to an engine out put torque) wherein A is a low engine load and speed operating zone in which the fuel injection amount is small, A1 is a relatively high engine load and speed operating zone within the operating zone A, B is a medium engine load and medium engine speed operating zone in which the fuel injection amount is medium, B1 is a relatively high engine load and speed operating zone within the operating zone B, C is a high engine load and speed operating zone in which the fuel injection amount is large C1 is a maximum engine load and low engine speed operating zone within the operating zone C, C2 is a maximum engine load and medium engine speed operating zone within the operating zone C, and C3 is a maximum engine load and maximum engine speed operating zone within the operating zone C.

As shown in FIG. 5(I), in the low engine load and the low engine speed operating zone A and other than the relatively high engine load operating zone A1, the injector 10 executes a lump sum injection into the chamber 4 at a predetermined timing within a predetermined crank angle, from a middle stage to the later stage of the compression stroke, for example, BTDC (Before Top Dead Center) 30°–120° CA (Crank Angle) so that a stratified combustion in which the fuel gas mixture is combusted in a stratified condition is established. The stratified combustion is accomplished by increasing the throttle opening to increase the introduction of the intake gas so that a lean condition far leaner than the theoretical air fuel mixture.

In the operating zone A1 in which both the engine load and speed are relatively high in the low engine load and speed operating zone, as shown FIG. 5(II), a fuel injection is divided and the fuel injections a and b are executed at predetermined timings from the earlier stage to middle stage (BTDC 60°–180° CA) in the compression stroke and from the middle stage to later stage (BTDC 30°–120° CA) in the compression stroke.

The stratified combustion is accomplished by increasing the throttle opening to increase the introduction of the intake gas so that a lean condition far leaner than the theoretical air fuel mixture. Where the above divided fuel injection is made in the operating zone, the later fuel injection amount is determined within 30–80%, preferably 50–80% of the total injection amount. The injection timings are determined in a manner that the injected fuels a and b in the earlier and later injections are stably combusted. Namely, the fuel is injected obliquely and downwardly from the injector 10 provided at the peripheral portion of the combustion chamber 4. The piston 3 is formed with the cavity 11 on the top surface. The later fuel injection is executed before the injected fuel a injected toward the central portion of the camber 4 by the earlier injection is excessively diffused. As a result, the later injected fuel b is effectively stratified over the earlier injected fuel a so that a combustion of the later injected fuel b is propagated to the earlier injected fuel a to accomplish the stable stratified combustion. In executing the divided fuel injection in the operating zone A1, an interval T of injection start timings between the earlier injection and later injection are provided more than 2 msec. Effective fuel injection time periods t1 and t2 of the fuel injections a and b, which excludes invalid fuel injection time periods due to a delay of opening operation and the like, are determined smaller than 1 msec respectively.

The injection start timing of the later fuel injection b is determined to correspond to that of the lump sum fuel injection in the operating zone A. That is, the injection start timing of the later fuel injection b is substantially the same as that of the lump sum fuel injection. As shown in FIG. 5(III), in the medium engine load and the medium engine speed operating zone B and other than the relatively high engine load operating zone B1, the fuel injection is divided so that the injector 10 executes the injection at predetermined timings within a predetermined range (BTDC 200°–360° CA) in the intake stroke and a predetermined range (BTDC 30°–120° CA) in the compression stroke. In addition, the stratified combustion is accomplished by increasing the throttle opening to make the combustion mixture lean to accomplish the stratified combustion.

Figure 5:
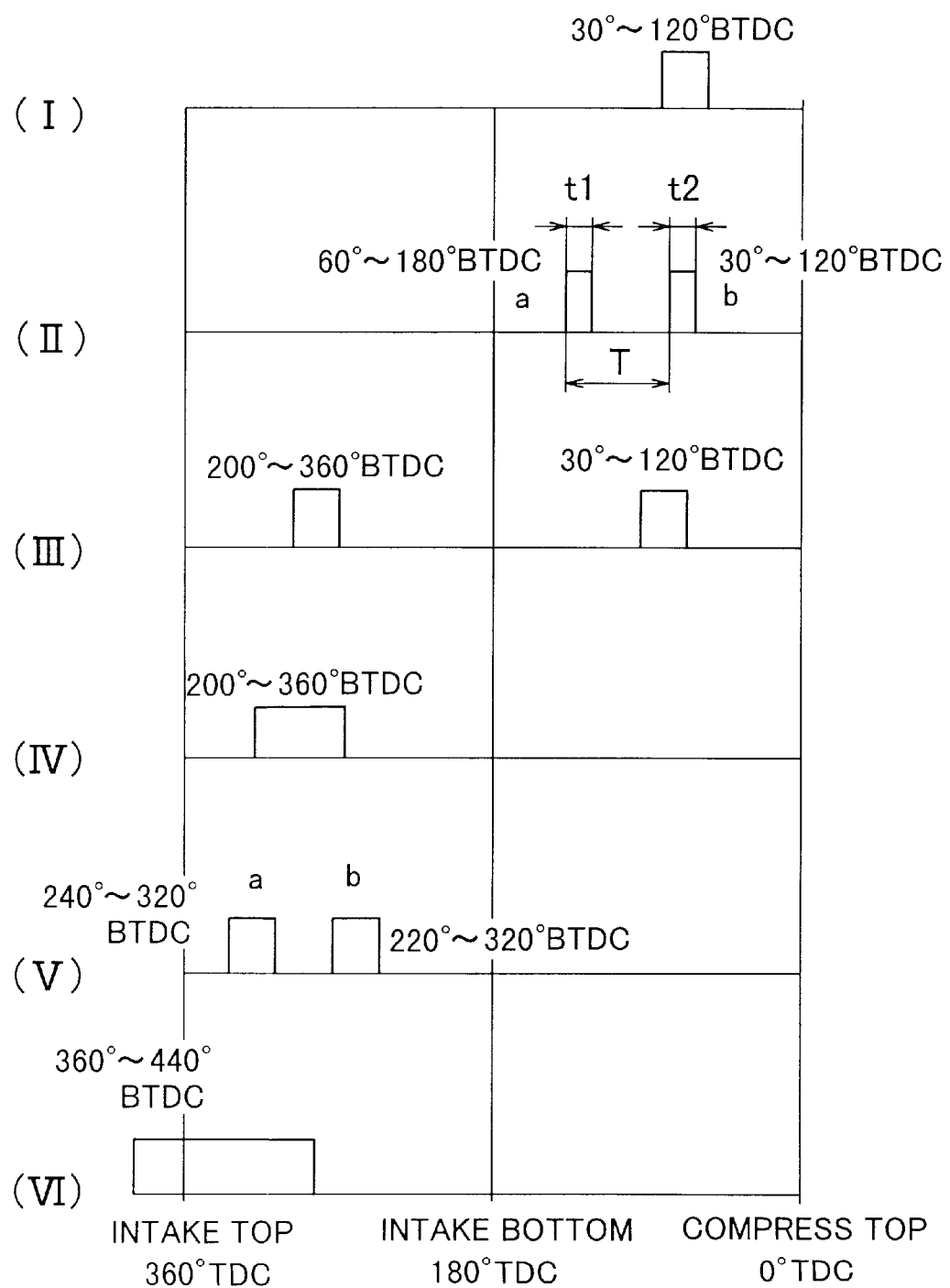
FIG. 5 is a time chart showing a fuel injection time period.

In the operating zone B1 in which both the engine load and speed are relatively high in the medium engine load and medium engine speed operating zone, as shown FIG. 5(IV), a lump sum fuel injection is executed at a predetermined timing in a predetermine range (BTDC 200°–360° CA) of the intake stroke. In addition, the throttle opening is increased to accomplish a uniform combustion by making the intake gas mixture uniform with a lean condition.

Other than in the maximum engine load operating zone C1–C3 of the high engine load operating zone C in which the fuel injection amount is increased, as well as the operating zone B1, a lump sum fuel injection is executed at a predetermined timing in a predetermine range of the intake stroke. In addition, the gas mixture is controlled to the theoretical one of air excessive rate 1 by the fuel control means 18 and accomplishes a uniform combustion.

In the operating zone C1 in which the engine load is the maximum but the engine speed is low in the high engine load operating zone C, as shown in FIG. 5(V), the fuel injection is divided so that the injector 10 executes the injection a and b at predetermined timings within a predetermined range (BTDC 220°–360° CA) and a predetermined range (BTDC 240°–360° CA) from the earlier stage to the middle stage of the intake stroke. In addition, the mixture is controlled to a uniform mixture with an enriched condition.

When the divided injection is executed in the operating zone C1, the fuel injection amounts a, b are controlled so that the later injection amount b is ranged 40–60% of the total fuel injection amount. Preferably, the earlier fuel injection amount a is greater than the later stage fuel injection amount b.

In the operating zone C2 in which the engine load is the maximum and the engine speed is medium in the operating zone C, as well as the operating zones B1 and C, a lump sum fuel injection is executed at a predetermined timing in a predetermine range of the intake stroke. In addition, the mixture is controlled to a uniform mixture with an enriched condition.

In the operating zone C3 in which the engine load and the engine speed are the maximum in the high engine load operating zone C, as shown in FIG. 5(VI), the lump sum injection is started at a predetermined timing within a predetermined range (BTDC 360°–440° CA) from the later stage of the compression stroke. In addition, the mixture is controlled by a fuel injection controller 18 to a uniform mixture with an enriched condition for a uniform combustion.

Figure 7:
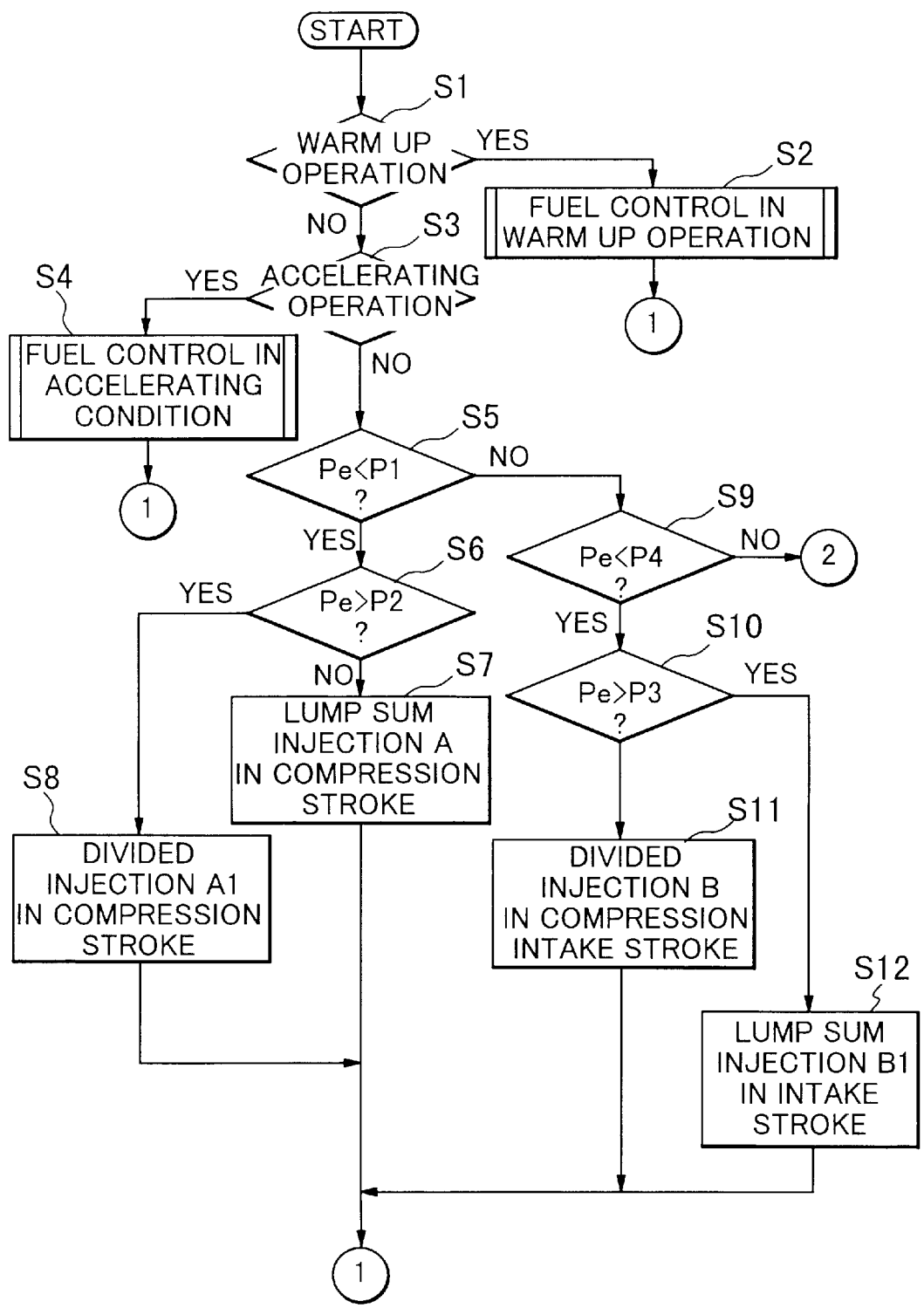
FIG. 7 is a flow chart showing a first stage of a fuel injection control operation.
Figure 8:
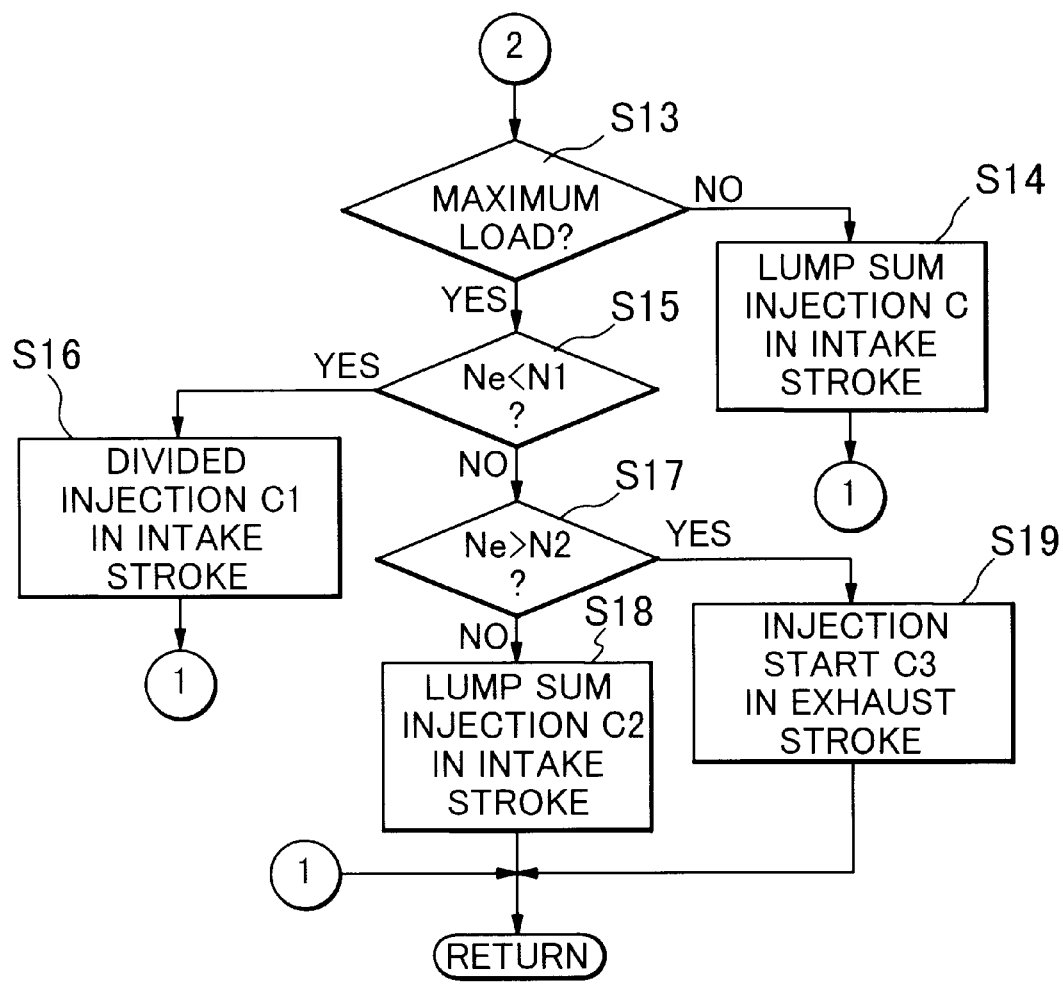
FIG. 8 is a flow chart showing a second stage of a fuel injection control operation.

Next, the fuel injection control executed by the controller 18 is explained taking reference with flow charts shown FIGS. 7 and 8.

It is determined based on the engine coolant temperature detected by the engine coolant temperature 15 if the engine operating condition is in a warming up operation in which a catalyst provided in the exhaust gas passage for cleaning the exhaust gas may not yet be activated (step S1). If this judgment is Yes, a warming up operation is executed for warming up the catalyst (S2).

That is, the fuel injection is divided to be executed in the intake stroke and the compression stroke so as to enrich the air fuel mixture around the ignition plug 9 more than the theoretical air fuel ratio and to control the mixture to the theoretical one in the chamber 4 as a whole (step S2). In this way, the fuel injection is controlled to facilitate the warming up of the engine while suppressing the emission of HC, NOx in the low engine temperature condition in which the cleaning effect of the catalyst cannot be obtained sufficiently. If it is judged No in the step S1 that the engine is not in the low engine temperature condition, it is judged if the engine is in an accelerating condition based on the output of the acceleration sensor 13 (step S3). If it is judged Yes, the acceleration control is executed wherein the fuel injection control is made to prevent the misfiring due to an abrupt increase of the intake gas amount caused by a deep acceleration pedal stroke (step S4).

In the direct injection engine in which a inform combustion zone is provided for injecting the fuel injection in the intake stroke, the intake gas charge amount is calculated at the fuel injection starting timing based on the intake air amount. The fuel injection amount is determined based on the intake air charge amount at the fuel injection start timing. If the calculate air fuel mixture before injection is greater than that after the injection, an additional fuel injection is executed in the earlier stage of the compression stroke by an amount corresponding to an increment therebetween. As a result, it is prevented that the air fuel ratio is unduly increased to cause the misfiring of the engine.

If it is judged No in the step S3, and it is recognized that the engine is in a normal operating condition, it is judged if a brake mean effective pressure Pe obtained from a map based on the engine speed and the acceleration stroke as a parameter is smaller than a predetermined first reference P1. That is, it is judged if the engine operating condition is in the low engine load and speed operating zone A (step S5).

If it is judged Yes in the step S5, it is further judged if the brake mean effective pressure Pe is greater than a second reference value P2 which is smaller than the first reference P1. By making this judgement, it is determined if the engine operation is in the relatively high engine load and speed operating zone A1 of the operating zone A (step S6). If this judgment is No in step S6, and thus if it is judged that the engine operating condition is an operating zone other than the zone A1 in the low engine load and speed operating zone A, as shown in FIG. 5(I), the lump sum fuel injection is executed into the chamber 4 at a timing within a predetermined range from the middle stage to later stage of the compression stroke so as to establish the stratified combustion with a lean gas mixture (step S7).

If it is judged Yes in step S6, and if it is judged that the engine is in the zone A1 of the zone A, as shown in FIG. 5(II), the fuel injection is divided so that the divided fuel injections a, b are executed to establish a stratified combustion with a lean condition of the gas mixture (step S8). If it is judged No in the step S5, and if it is judged that the brake mean effective pressure Pe is greater than the first reference P1, it is further judged by determining the mean effective pressure Pe is smaller than a fourth reference value P4 which is greater than the first reference P1 as to if the engine is in the medium engine load and engine speed zone B in which the fuel injection amount is medium (step S9).

If it is judged Yes in step S9, and it is further judged if the mean effective pressure Pe is greater than the first reference value P1 and a predetermined third reference value P3 which is smaller than the fourth reference P4 to thereby determine if the engine is in the relatively high engine load and speed operating zone B1 in the medium engine load and engine speed zone B (step S10).

If it is judged No in the step S10, and if it is judged that the engine is in an operating zone other than the zone B1 of the zone B, as shown in FIG. 5(III), the fuel injection is divided so that the divided fuel injections a, b are executed at a predetermined timing in the compression stroke and a predetermined timing in the intake stroke to establish a slight stratified combustion with a lean condition of the gas mixture (step S11).

If it is judged Yes in step S10, and that the engine is in the zone B1 of the zone B, as shown in FIG. 5(IV), the lump sum injection is executed in the intake stroke, the fuel injection amount is controlled to provide a lean gas mixture than the theoretical air fuel ratio and the throttle opening is controlled to establish a uniform mixture with a lean condition by means of the fuel controller 18 to make a uniform (step S12). If it is judged No in the step S9, and if it is judged that brake mean effective pressure Pe is greater than the fourth reference P4 so that the engine is in the operating zone C, it is further judged if the accelerator is in a full open condition, that is, if the engine is in the maximum load zone (step S13). If it is judged No in the step S13, and if it is judged that the accelerator is not in full open condition in the zone C, the lump sum injection is executed at a predetermined timing in the intake stroke. In addition, the fuel injection amount and throttle opening are controlled to provide an excessive air rate with 1 or the theoretical air fuel ratio to establish a uniform gas mixture for the uniform combustion (step S14).

If it is judged Yes in the step S13, and if it is judged that the accelerator is in full open condition, it is further judged that the engine speed Ne is samller than a predetermined reference N1, for example 3000 rpm (step S15). If it is judged Yes in the step S15, and if it is judged that the engine load is in the zone C1 in which the maximum and the engine speed is low in the zone C, as shown in FIG. 5(V), the fuel injection is divided so that the divided fuel injections are executed at a predetermined timing in the earlier stage to the middle stage of the compression stroke and a predetermined timing in the earlier stage to the middle stage of the intake stroke. In addition, the fuel injection is controlled to provide a uniform air fuel mixture richer than the theoretical one for the uniform combustion (step S16).

If it is judged No in the step S15, and if it is judged that the engine speed is greater than the first reference N1, it is further judged if the engine speed is greater than a second reference N2, which is greater than the first reference N1, for example 5500 rpm (step S17). If it is judged No in the step S17, and if it is judged that the engine is in the zone C2 in which the engine load is the maximum and the engine load is medium in the zone C, the lump sum injection is executed at a predetermined timing in the intake stroke. The fuel injection amount is controlled to provide an air fuel mixture richer than the theoretical one to inject the mixture in the uniform condition (step S18).

If it is judged Yes in the step S17, namely if it is judged that the engine is in the operating zone C3 in which the engine load and speed are the maximum in the zone C, as shown in Figure F(IV), the lump sum injection is executed at a timing starting from the later stage of the exhaust stage to the earlier stage of the intake stroke. In addition, the fuel injection amount is controlled to provide an air fuel mixture richer than the theoretical one to inject the mixture in the uniform condition (step S18).

As aforementioned, when the engine is in the operating zone A in which the engine load and the engine speed are low, the fuel injection is made from the injector 10 to accomplish a stratified combustion. With this engine, in the operating zone A1 in which the engine load and engine speed are relatively high, the fuel injection is divided to be executed in the compression stroke. As a result, the earlier injected fuel a is properly diffused to be vaporized and atomized to improve the fuel consumption efficiency. The later injected fuel b is concentrated around the plug 9 to improve a combustion stability. By introducing the above direct injection engine, an operating zone in which the fuel injection is executed in the compression stroke can be expanded.

Figure 6:
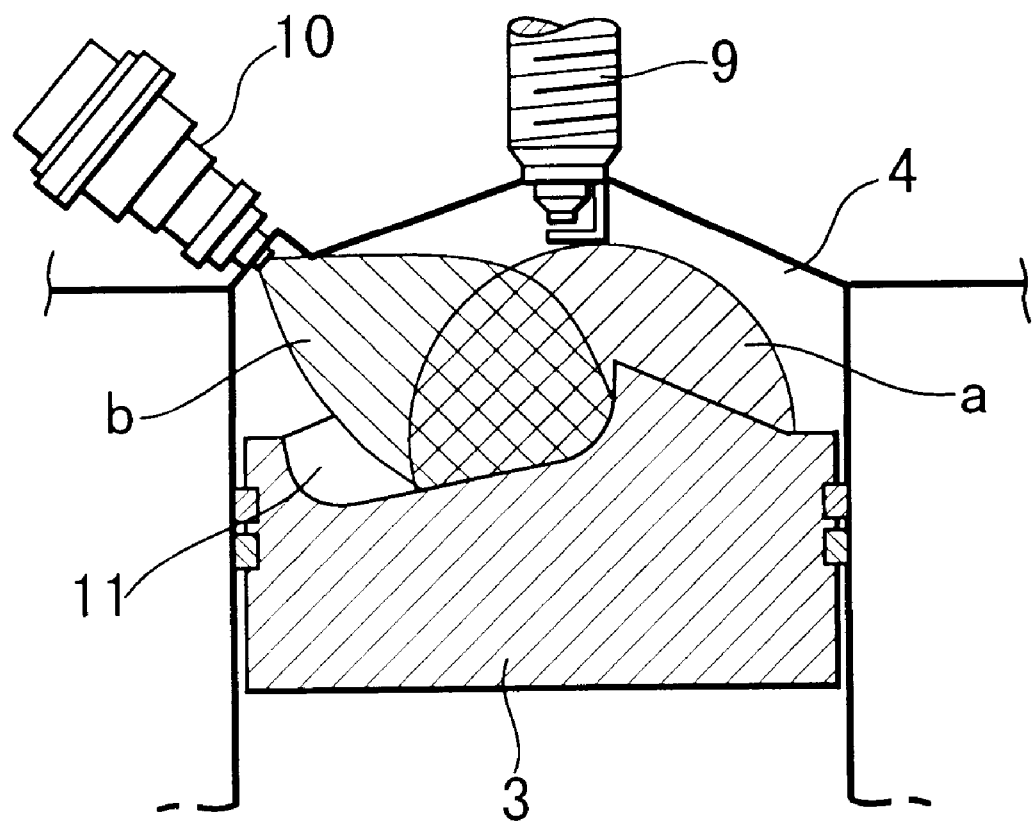
FIG. 6 is a sectional view imaginary showing a fuel combustion.

In the operating zone A1 in which the engine load and engine speed are relatively high in the zone A, the fuel injection amount is relatively increased and an interval from the fuel injection to the ignition timing is reduced. Under such conditions, if a lump sum fuel injection is made, the injected fuel would be excessively concentrated around the plug 9 resulting in deterioration of mixing fuel with the air and deteriorating the combustion efficiency. In addition, the reduction of the time period for vaporization and the atomization of the fuel would cause an incomplete combustion to deteriorate the combustion stability. On the contrary, if the divided fuel injection is executed to inject the fuel plural times in the compression stroke, as shown in FIG. 6, the earlier injected fuel a can be properly diffused to thereby obtain well-mixing the fuel with the air while preventing an excessive concentration of the fuel around the plug 9. As a result, the combustion efficiency can be improved. In addition, the later injected fuel b is properly concentrated around the plug 9 to form a proper air fuel mixture. Therefore, by maintaining a proper stratified condition in the chamber 4, the incomplete combustion can be prevented to thereby improve the combustion stability.

Figure 9:
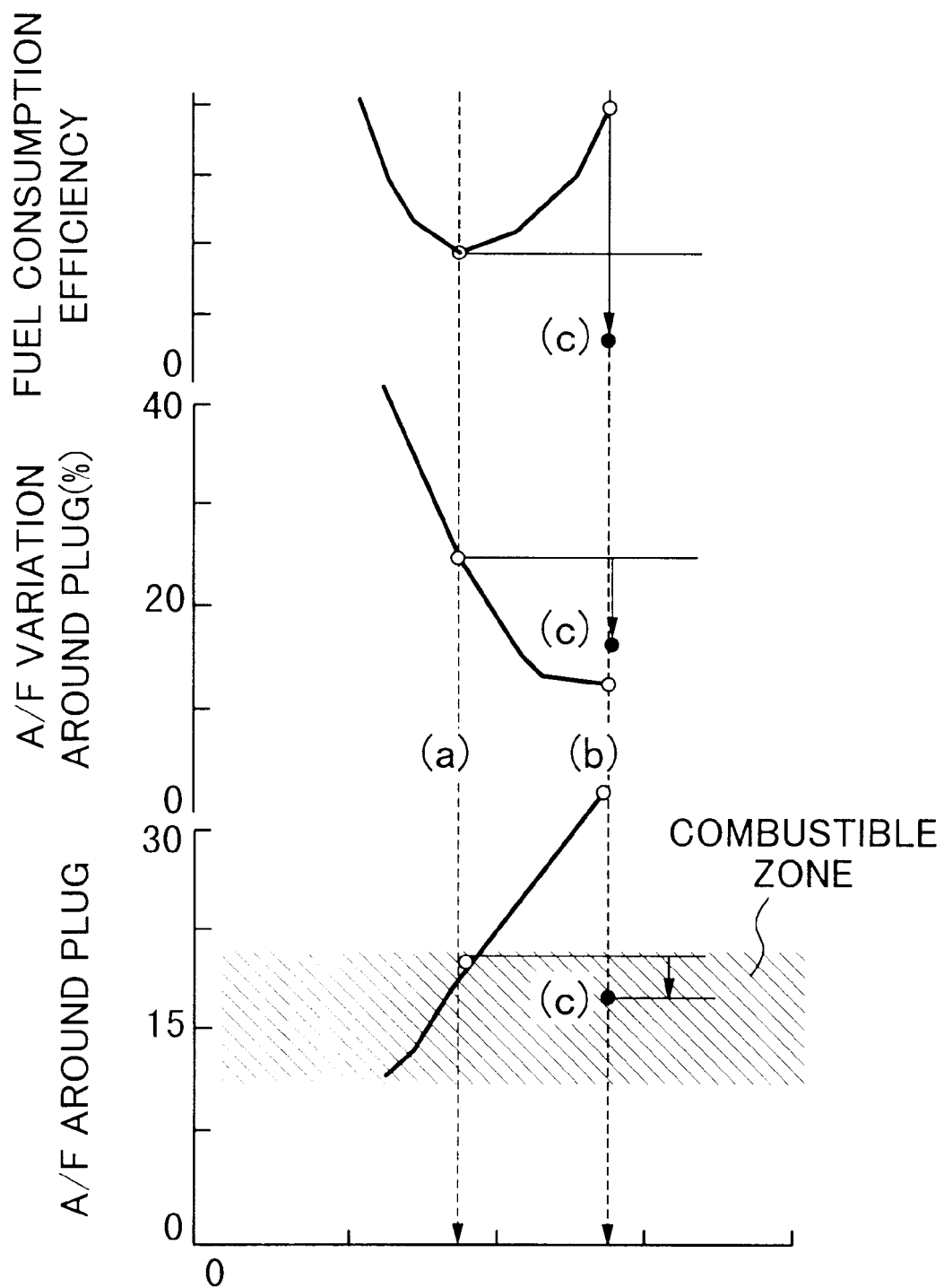
FIG. 9 is a graphical representation of comparison of A/F, variation around the ignition plug and the fuel consumption efficiency in the case of a lump sum fuel injection and a divided fuel injection in the compression stroke in a specific operating condition.

Taking reference with FIGS. 9 and 10, the above feature will be explained. FIG. 9 shows data of comparison of A/F (air fuel ratio) variation around the ignition plug and the fuel consumption efficiency in the case of a lump sum fuel injection and a divided fuel injection in the compression stroke in a specific operating condition wherein FIG. 10(a) is a lump sum injection at a timing providing the optimized fuel consumption efficiency in the compression stroke, FIG. 10(b) is a lump sum injection at an advanced timing in the compression stroke, and FIG. 10(c) is a divided fuel injection in which the fuel injection is made twice at timings in which the later fuel injection timing provides the optimized fuel consumption efficiency in the compression stroke as shown in FIG. 10. In FIG. 9, Δt is a time period from the injection start timing (the earlier fuel injection starting timing in the case of the divided fuel injection) to the ignition timing.

As shown in FIG. 9, the divided fuel injection is executed in which the later fuel injection provides the optimized fuel consumption efficiency. The earlier fuel injection is executed at a timing advanced from the lump sum injection which provides the optimized fuel consumption efficiency in the compression stroke so as to obtain the time period for vaporization and atomization so that a variation of the air fuel ratio around the plug is suppressed. In addition, the air fuel ratio around the plug 9 is properly controlled to provide a fuel rich mixture due to the later fuel injection. That is, the gas mixture around the plug 9 is kept within a combustible zone as shown in FIG. 9.

Further, an experiment is carried out to compare the improvement in the fuel consumption efficiency. In one condition, a lump sum fuel injection is executed in the compression stroke in the operating zone A1. In another condition, a divided fuel injection is executed wherein the fuel is injected twice in the compression stroke. As shown in FIG. 11, it is understood that the improvement of the fuel consumption efficiency of the divided fuel injection in the compression stroke is greaten than that of the lump sum fuel injection in the compression stroke and the divided fuel injection in which the fuel is injected in the compression stroke and the intake stroke respectively.

Figure 12:
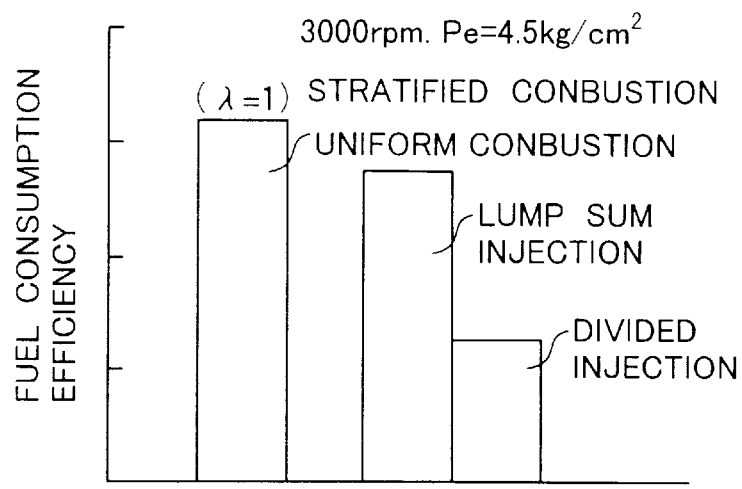
FIGS. 12(a), 12(b) and 12(c) are graphical representations of the fuel consumption efficiency in various operating conditions.
Figure 12:
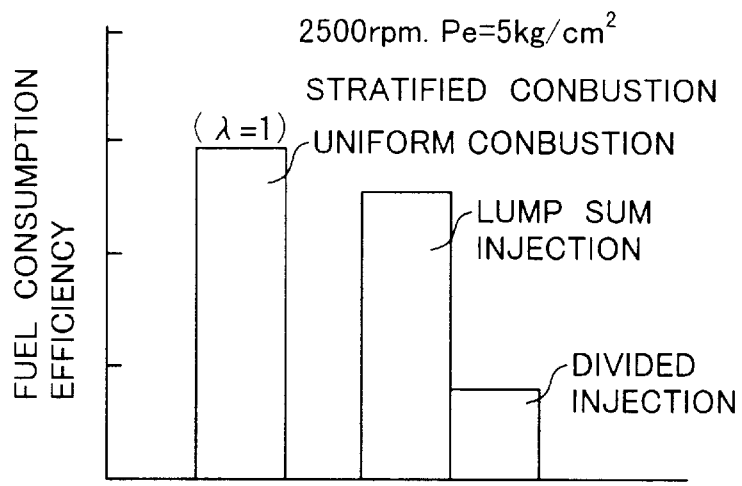
Figure 12:
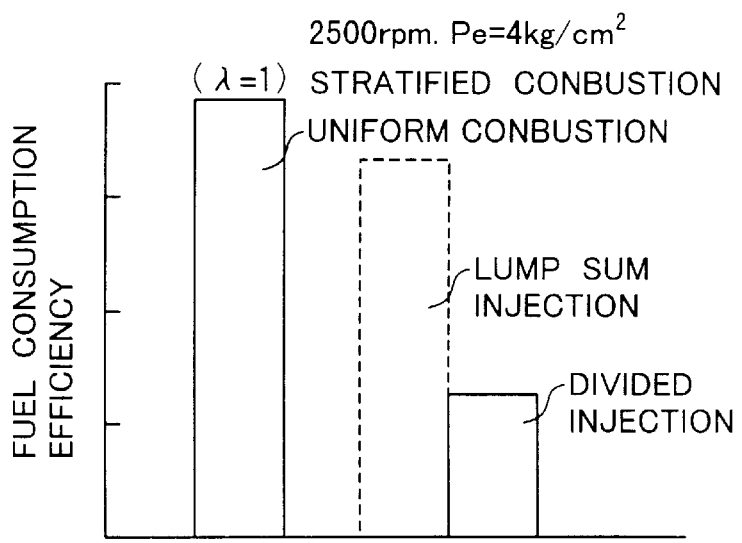

The fuel consumption efficiency is compared with regard to the operating conditions in which the engine speed Ne is 3000 rpm with the brake mean effective pressure Pe 4.5 Kg/cm$^2$, and in which the engine speed Ne is 2500 rpm with the brake mean effective pressure Pe 4 Kg/cm$^2$. In the above operating conditions, the fuel injection is made as follows. In a first condition, a lump sum fuel injection is executed with the air fuel mixture of the theoretical air fuel ratio ($\lambda$=1) in the intake stroke to accomplish a uniform combustion. In a second condition, a lump sum fuel injection is executed in the compression stroke to accomplish a stratified combustion. In a third condition, a divided fuel injection is executed to inject the fuel twice in the compression stroke to accomplish a stratified combustion. Data as shown in FIGS. 12(a)–(c) is obtained with regard to the fuel consumption efficiency. It would be understood from FIGS. 12(a)–(c) that the fuel consumption efficiency can be improved by virtue of the divided fuel injection in the compression stroke in the engine operating zone A including the above conditions of the engine speed and the effective pressure Pe.

When the later fuel injection amount b is determined within a range of 30%–60% in the case where the divided fuel injection is executed in the compression stroke, the ignition stability can be further improved while maintaining the improvement of the fuel consumption efficiency without taking account of the EGR effect. If the later fuel amount b is determined lower than 30%, the earlier fuel injection amount a must be increased to keep the same amount of the total injection to cause insufficient vaporization and atomization of the fuel. If the injection start timing of the earlier fuel injection is advanced in order to avoid this situation, the fuel a is excessively diffused. In addition, the gas mixture around the plug is lightened due to the small amount of the fuel b to deteriorate the ignition stability and the fuel consumption efficiency.

On the contrary, if the later fuel injection b is set greater than the above range, the ignition stability is improved. When the fuel injection amount is increased, an excessive fuel is concentrated around the plug 9 to deteriorate the fuel consumption efficiency. Where the later fuel injection exceeds approximately 70% of the total amount, the improvement of the fuel consumption efficiency is reduced when the EGR is not executed. The rate of the later fuel injection b was changed to examine the influence to the improvement of the fuel consumption efficiency. Result of the experiment is shown FIG. 13. The experiment was done under a condition that the earlier fuel injection was executed at a timing of 160° BTDC and the later fuel injection was executed at a timing of 97° BTDC without EGR under the operating condition that the engine speed is 3000 rpm and the brake mean effective pressure is 4.5 kg/cm$^2$ (running speed 120 km/h).

Figure 14:
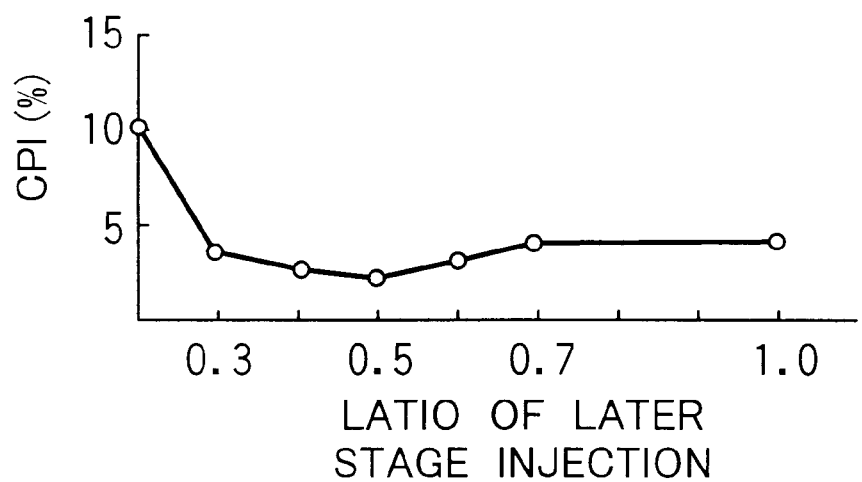
FIG. 14 is a graphical representation showing a variation of an indicated mean effective pressure and the later fuel injection rate.

The indicated mean effective pressures were calculated based on the measurement of the pressure in the combustion chamber and the crank angle to obtain a value CPI (Coefficient of Variation of Indicate Mean Effective Pressure) for denoting variations of the indicated mean effective pressure between the cylinders. The result was obtained as shown in FIG. 14.

As seen from the result, it is desirable to determine the later fuel injection amount within a range of 30%–60% without EGR as well.

The above data was obtained without EGR. However, EGR(Exhaust Gas Recirculation) is executed in order to suppress NOx emission and pumping loss in the operating zone A for the stratified combustion including the zone A1. When EGR is made, the injected fuel is facilitated to be vaporized and atomized due to the fact that the injected fuel is heated by EGR gas of a high temperature. On the other hand, the ignition performance and combustion performance are a bit deteriorated due to the introduction of EGR which is inert compared with the intake air fuel mixture. In view of this, when EGR is executed, the later fuel injection amount is increased to improve the combustion efficiency without deterioration of vaporization and atomization of the fuel.

Figure 13:
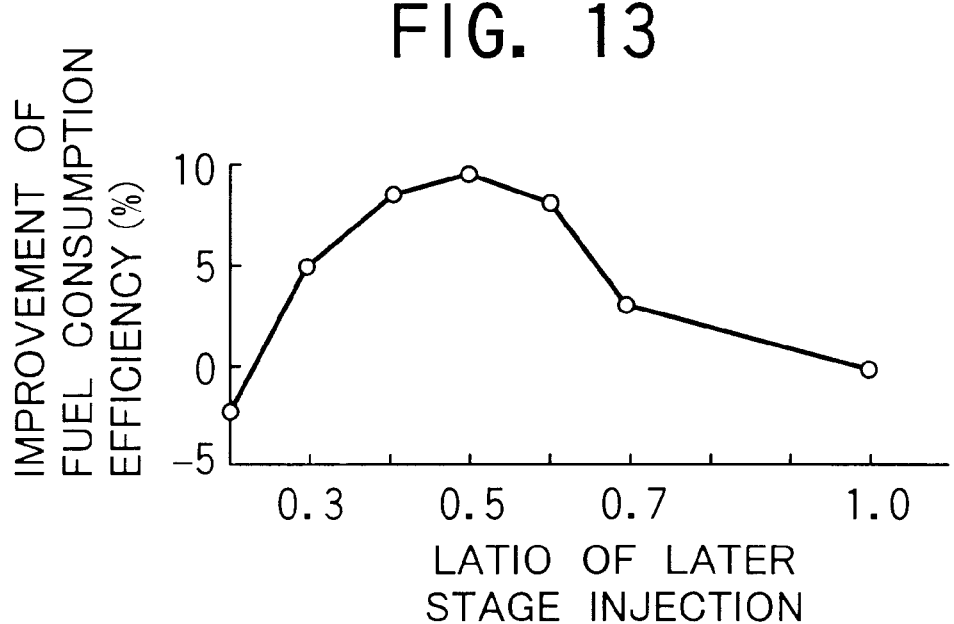
FIG. 13 is a graphical representation showing a relationship between the improvement of the fuel consumption efficiency and the later fuel injection rate.

Therefore, when EGR is executed, the later fuel injection amount is shifted to be increased by about 10%–20% in FIGS. 13 and 14. Accordingly, taking account of the change of the operating condition in the zone A1 and the execution of EGR, it is desirable to determine the later fuel injection amount within 30%–80% of the total injection amount. In particular, when EGR is executed, it is desirable to determine the later fuel injection amount b within 50%–80% as shown in FIGS. 15(a)–(d). According to the above structure, the injector 10 is disposed so that the fuel is injected obliquely and downwardly from the peripheral portion of the combustion chamber 4. The cavity 11 is formed on the top surface of the piston 3. The fuel injection timings are determined so that the earlier injected fuel a and the later injected fuel b are effectively overlapped with each other. Thus, both the fuel a and b can be continuously and stably combusted. Thus, it is prevented that the earlier injected fuel a is combusted incomplete resulting in a deterioration of the fuel consumption efficiency and ignition stability.

In addition, the intake system is constructed so that an inclined vortex including a swirl component and a tumble component is produced. With this structure, the injection timing is determined so that the injected fuel is caught by the cavity 11 formed on the top of the piston 3. As a result, the injected fuel is well mixed with the air in the cavity 11 and is introduced around the plug 9. The ignition performance can be further improved.

Where the interval T from the fuel injection start timing of the earlier fuel a to that of the later fuel b is determined not less than 2 msec in executing the divided fuel injection, the injection time period from the start of the earlier fuel injection a to the end of the later fuel injection b can be smoothly obtained. Thus, it is prevented that the earlier and later injected fuels are excessively overlapped to make the mixture overly rich. Consequently, the injected fuel is facilitated to be vaporized and atomized to further improve the fuel consumption efficiency in the operating zone A1.

In another aspect of the prevent invention, the effective injection time period of the injector 10, which excludes an invalid fuel injection time period due to the delayed opening operation of the needle valve in the injector 10, is determined not more than 1 msec in executing the divided fuel injection. Thus, it is prevented that the injected fuels a and b are excessively concentrated. Consequently, the fuel vaporization and atomization can be facilitated.

In the above embodiment, in the operating zone A in which the fuel is injected in the compression stroke, the divided fuel injection is executed in the high engine load condition. On the other hand, the lump sum fuel injection is executed in the low engine load condition in the zone A. In this case, the injection start timing of the later injected fuel b is determined corresponding to that of the lump sum fuel injection in the case of the same engine speed. The injection start timing of the later fuel is determined at substantially the same timing as that of the lump sum injection. Where the later fuel b is injected at a timing which is determined as the optimized timing for stratifying the injected fuel based on the engine speed, it is possible to form an air fuel mixture of a proper air fuel ratio (A/F) around the ignition plug 9. The fuel injection not necessarily be twice but three times or more.

In another aspect of the invention, the divided fuel injection may be made in an operating zone in which either the engine load or the engine speed is relatively low in the zone A. In this case, when the engine is in the operating zone A1 in which both the engine load and speed are relatively high in the zone A, the fuel injection pressure is increased compared with the operating zone in which either the engine load or speed is relatively low. The fuel injection time periods for the fuels a and b can be reduced in the zone A1 in which the fuel injection amount is relatively high and the interval from the fuel injection to the ignition timing is relatively small. Consequently, it is prevented that the injected fuels a, b are excessively concentrated. Thus, the fuel vaporization and atomization can be improved.

In the relatively high engine load and speed operating zone in which the fuel injection is divided to inject the fuel plural times, the earlier fuel injection is advanced and/or the fuel injection amount is increased compared with the relatively low engine load and speed operating zone. As a result, the earlier injected fuel a can be effectively diffused to facilitate the fuel vaporization and atomization.

Where the engine is in an accelerating condition in the operating zone A1 in which the divided fuel injection is executed in the compression stroke, the earlier fuel injection is advanced compared with an usual operating condition and the fuel injection amount is increased. In this way, although the fuel injection is to be increased in such accelerating condition, the injected fuel can be smoothly vaporized and atomized to improve the fuel consumption efficiency in the accelerating condition in the zone A1.

In another embodiment, the divided fuel injection is made in the compression stroke in the warmed up condition in the zone A1. On the other hand, in the low engine temperature condition or warming up condition, the divided fuel injection is made to inject the fuel in the intake stroke and the compression stroke. In addition, the mixture around the ignition plug 9 is enriched not lighter than the theoretical one and the air fuel ratio is controlled to the theoretical one as an entire air fuel mixture in the chamber 4. Consequently, an after burning of the fuel can be facilitated to warm up the catalyst and suppress the emission of HC and NOx.

Hereinafter, a preferable fuel injection timing, injection amount, injection rate, injection intervals and the like in accordance with the operating condition in the zone A1 in which the divided fuel injection is made in the compression stroke are explained.

FIGS. 15(a)–(d) show data with regard to the fuel injecting condition in various operating conditions in an operating zone in which the divided fuel injection is executed to inject the fuel twice in the compression stroke to thereby provide the optimized fuel consumption efficiency. In FIG. 15(a) shows the injection timing and pulse of the later injection, FIG. 15(b) shows the injection timings (injection start timing) and pulses (fuel injection amount) of the earlier injection in the upper and lower positions of the points showing the operating conditions FIG. 15(c) shows the later injection rate (flow rate) to the total fuel injection amount in the respective operating conditions and FIG. 15(d) shows the injection intervals between the earlier and later fuel injection.

The data in FIGS. 15(a)–(d) were obtained by using an injector with an injection rate 15–16 $mm^3$/msec and injection pressure of 8 Mpa wherein the fuel consumption efficiency is optimized in EGR condition. As seen from FIGS. 15(a)–(d), the later injection pulse in (a) is greater than the earlier injection pulse in (b). The later fuel injection rate to the total injection is ranged from substantially 50% to 80%. Thus, a proper stratified condition can be obtained and the combustion stability and the combustion efficiency can be improved under EGR condition. The fuel injection amount and the fuel injection rate can be changed in accordance with the operating condition. Specifically, the earlier fuel injection amount is mainly changed in accordance with the engine load so as to be increased as the engine load is increased. Accordingly, it is prevented that the later fuel injection is unduly increased to cause an overly rich condition around the ignition plug to provide a proper stratified condition.

However, when the engine is in the relatively low engine load condition in the zone A in which the divided fuel injection is made in the compression stroke, the later fuel injection amount is not smaller than the earlier fuel injection amount. In the illustrated operating condition in FIGS. 15(a)–(d), the later fuel injection amount is greater than the earlier fuel injection entirely.

On the other hand, the fuel injection amount is maintained substantially constant regardless of the change of the engine speed. However, the earlier fuel injection amount is slightly changed in accordance with the change of the engine speed due to the fact that the combustion efficiency is slightly influenced by the engine speed. The earlier and later fuel injection time periods are determined within about 1 msec but not smaller than a predetermined lower limit (for example about 0.15 msec) due to the fact that the controllability of the injector is deteriorated when the earlier injection time period is unduly reduced in the relatively low engine speed condition.

The injection timing and the interval of the divided fuel injections may be changed. The respective fuel injection timings of the earlier and later fuels a and b are advanced as the engine load is increased. As a result, the injected fuel is properly diffused to prevent the mixture from being overly rich. The injection timings of the earlier and later fuels a and b are advanced as the engine speed is increased. The advancement of the injection timings due to the engine load is generally greater than that due to the engine speed. Accordingly, the interval from the injection to the ignition can be maintained properly. It is prevented that the interval is unduly small to cause the fuel to be concentrated, or the interval between the respective injections in the divided injection is unduly reduced to be overlapped with each other.

Thus, the fuel injection amount is increased and the injection timing is advanced in the relatively high engine load and speed zone in the operating zone A1 compared with the relatively low engine load and speed operating zone in the zone A1. However, if the earlier fuel injection timing is unduly advanced, the injected fuel would not be properly caught by the cavity 11 on top of the piston 3 to be excessively diffused to deteriorate the combustion performance. In view of this, the advancement of the earlier fuel injection is to be limited to the extent that the injected fuel is properly caught by the cavity 11 (trap limit). Thus, as the engine speed is increased to cause an excessive advancement beyond the trap limit, the injection timing is maintained at the trap limit.

A trap performance of the injected fuel is influenced by the configuration of the cavity 11 and the orientation of the injector 10. As the angle θ of the injector 10 is increased, the trap performance is improved as the injection timing is advanced. If it is possible to advance the injection timing largely with maintaining a desirable trap performance, the fuel vaporization and atomization can be improved in the relatively high engine load and speed operating condition. Thus, it is possible to expand the stratified operating zone to a higher engine load and speed operating zone to which the divided injection is applied to accomplish the stratified combustion.

The interval between the earlier and later fuel injection timings is controlled in accordance with the operating condition wherein the earlier fuel injection timing is mainly adjusted as shown in FIG. 15(d). The interval is increased in the relatively low engine speed operating zone of the zone A1 due to the fact that the earlier fuel injection timing is advanced as the engine load is increased. The interval is substantially maintained constant in the relatively high engine speed operating zone in which the injection timing is close to the trap limit due to the fact that the advancement of the injection timing is limited.

As aforementioned, the injection timing, injection amount, injection rate, injection interval are controlled in accordance with the operating condition in the zone A1 in which the divided fuel injection is executed in the compression stroke so that a proper stratified condition can be obtained to improve the fuel consumption efficiency.

When the engine is in the relatively low engine speed operating zone C1 in the high engine load operating zone in which the uniform combustion is accomplished, the divided fuel injection is executed in the range from the earlier stage to middle stage of the intake stroke. Thus, a desirable intake gas charge amount can be accomplished. The air fuel mixture is well mixed to accomplish a uniform combustion. Consequently, the engine output can be effectively increased with an improved fuel consumption efficiency.

Figure 16:
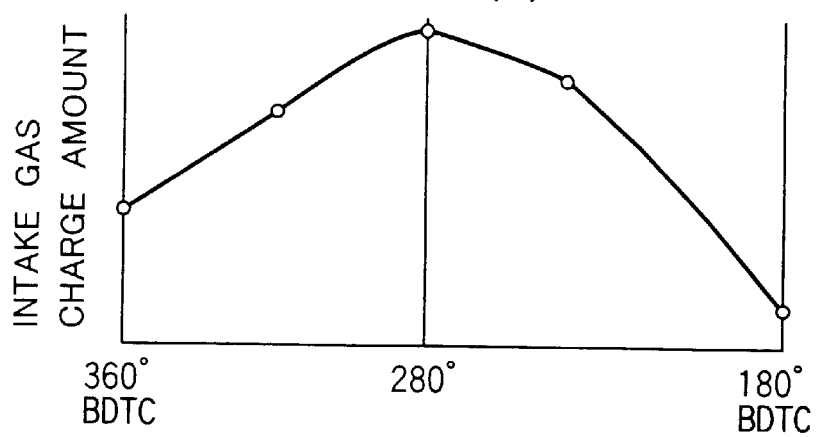
FIGS. 16(a), 16(b) and 16(c) are graphical representations of an intake gas charge amount, air fuel ratio(A/F) and change of the combustion time period.
Figure 16:
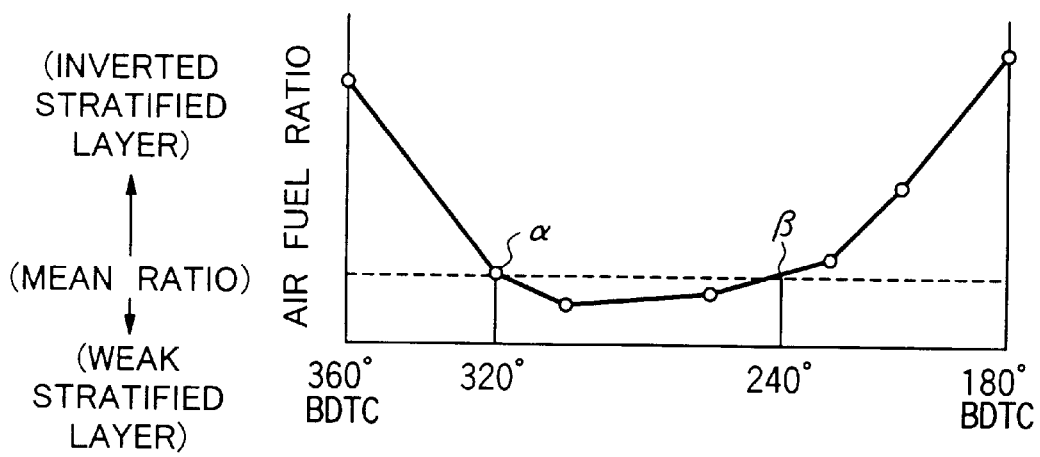
Figure 16:
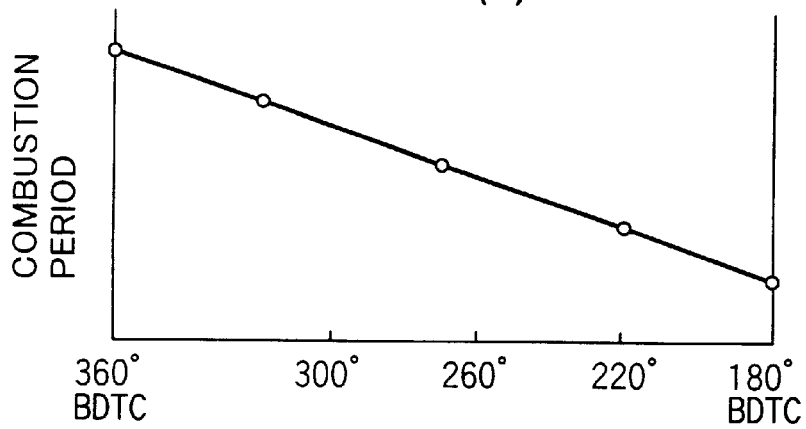

When the fuel injection is made in the intake stroke to accomplish the uniform combustion in the high engine load operating zone C1, the intake gas charge amount is changed in accordance with the fuel injection timing as shown in FIG. 16(a). In addition, a uniformity or homogeneity of the air fuel mixture is changed in accordance with the injection timing as shown in FIG. 16(b) as well. In this case, the injection timing for the optimized intake gas charge amount is different from that for the optimized homogenized air fuel mixture. The injection timing, which provides the optimized intake gas charge amount, appears in a range from the earlier stage to middle stage of the intake stroke. In view of this, the fuel injection is divided to plural times during the earlier stage to the middle stage of the intake stroke so that the fuel injection can be made corresponding to the timings for the optimized intake gas charge amount and the optimized homogeneity of the air fuel gas mixture. The injection timing for the optimized homogeneity exists between the points ∀, ∃ included a zone in which the mixture is slightly stratified. However, as the injection timing is retarded, the combustion time period is reduced. Thus, the fuel injection is executed with the later point beta so that the combustion time period is reduced to increase the engine output.

In the relatively high engine speed zone C3 in the high engine speed zone C in which the uniform combustion is accomplished, the fuel injection start timing is in the later stage of the exhaust stroke so that an enough time period from the fuel injection to the ignition can be obtained to facilitate the fuel vaporization and atomization. Consequently, the fuel consumption efficiency can be improved to increase the engine output. In addition, it is prevented that the injected fuel passes through the chamber 4 even though the fuel injection is started at the later stage of the exhaust stroke due to the fact that a stroke speed of the piston 3 is very high in the zone C3 so that the exhaust valve 8 is closed before the injected fuel reaches the exhaust port 6. In the illustrated embodiment, the injector 10 is disposed to inject the fuel from the side of the intake port 5 in the peripheral portion of the chamber 4 to the chamber 4. With this structure, an enough time period can be obtained for the fuel injected at the later stage of the exhaust stroke to reach the exhaust port so that the passing through of the fuel can be effectively prevented. In this connection, in order to prevent the passing through of the fuel, it is preferable to provide the fuel injection angle θ to the horizontal plane with more than 30°.

Figure 17:
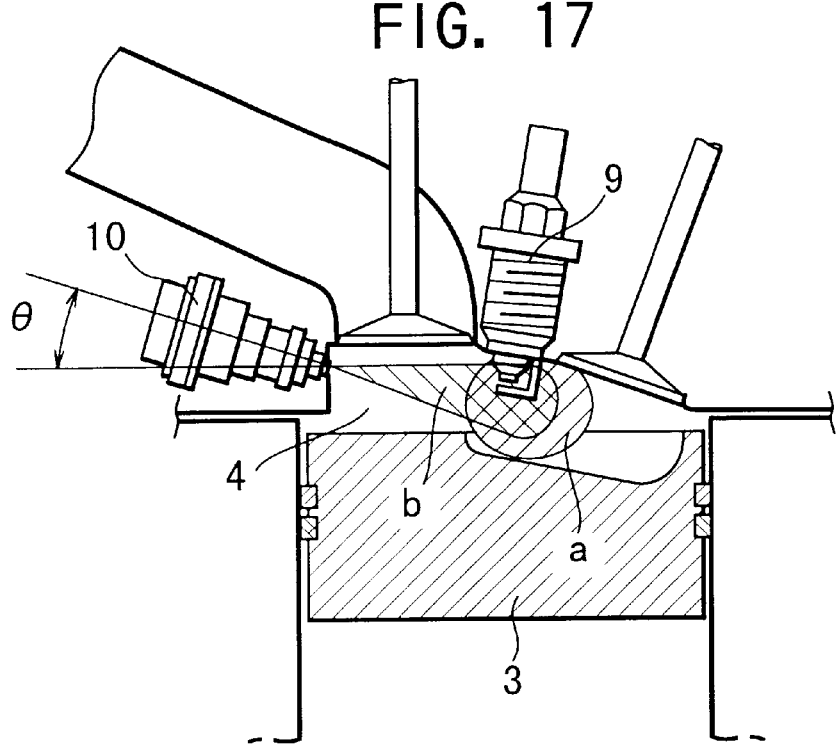
FIG. 17 is a sectional view of a direct injection engine of another preferred embodiment in accordance with the present invention.

In the illustrated embodiment shown in FIG. 17, the angle of the injector 10 is set at 10–25° so as to inject the fuel from the peripheral portion of the chamber 4 to the ignition plug 9 which is projected into the central portion of the chamber 4.

The divided fuel injection can be executed in the compression stroke to inject the fuels a, b with twice in the operating zone A1 in which at least one of the engine load and speed is high in the zone A in which the stratified combustion is accomplished. In this case, a relatively small injection angle of the injector 10, such as 20–40° is set In addition, it is preferable to form the cavity 11 on the piston 3 at an opposite side to the injector 10 to prevent the fuel from adhering to the piston surface.

Figure 18:
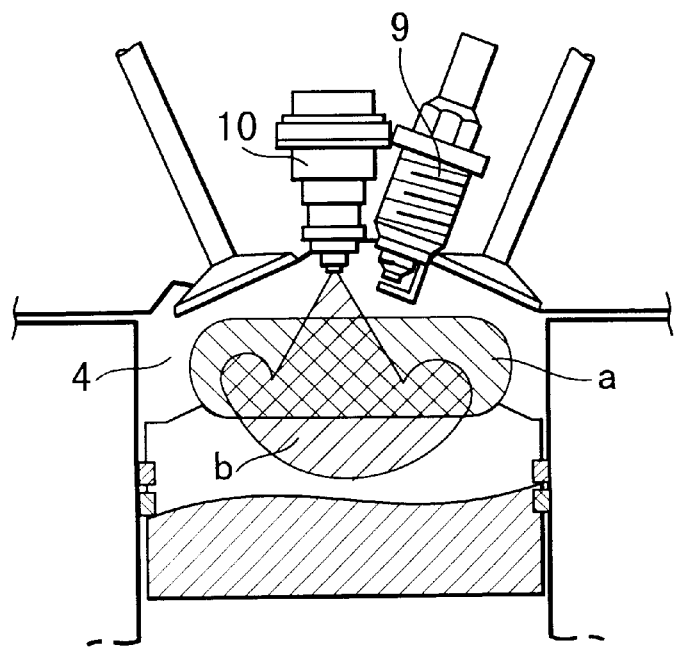
FIG. 18 is a sectional view of a direct injection engine of still another preferred embodiment in accordance with the present invention.

Further, in the illustrated embodiment shown FIG. 17, the ignition plug 9 and the injector 10 are disposed to be projected into the combustion chamber at the upper and central portion. In this embodiment, a cavity 11 is formed on the top surface of the piston 3 at the central portion. The arrangement of the injector 10 is determined so that the fuel injection can be effected to introduce the injected fuel to the ignition plug to thereby establish a stratified condition without the cavity 11. In the above embodiments shown in FIGS. 17 and 18, the divided fuel injection can be executed to combust the fuels a and b continuously and stably by providing the earlier and later fuel injection timing and amounts properly. As a result it is prevented that the earlier injected fuel a is combusted incomplete to deteriorate the fuel consumption efficiency and the ignition stability.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A direct injection engine comprises:
    an injector disposed in an upper portion of a combustion chamber defined above a piston disposed in a cylinder of the engine with a fuel injecting direction of the injector being provided so that a fuel being injected toward a top portion of the piston;
    an ignition plug disposed at an upper portion of the combustion chamber, an engine operating condition detector for detecting an engine operating condition, the fuel being injected in a compression stroke from the injector when it is detected by the engine operating condition detector that the engine is in a low engine load and speed zone so as to stratify an injected air fuel mixture around the ignition plug to accomplish a stratified combustion; and
    fuel control means for controlling a fuel injection so as to inject the fuel plural times into the combustion chamber in a compression stroke when at least one of an engine load and an engine speed is relatively high in an engine operating zone for accomplishing the stratified combustion.

2. A direct injection engine as recited in claim 1 wherein the fuel control means controls the fuel injection so that the fuel is injected plural times in the compression stroke when the engine load and speed are relatively high in a stratified operation zone in which the fuel injection is executed to accomplish the stratified combustion resulting in avoidance of excessive fuel concentration around the ignition plug.

3. A direct injection engine as recited in claim 1 wherein the injector is disposed to inject the fuel obliquely downwardly from a peripheral portion of the combustion chamber in executing the fuel injection plural times in the compression stroke.

4. A direct injection engine as recited in claim 3 wherein respective fuel injection timings in executing the divided fuel injection are determined so that a fuel injection area of an earlier fuel injection is overlapped with that of a later fuel injection form in the cavity which is disposed opposite to the ignition plug.

5. A direct injection engine as recited in claim 4 wherein an intake system of the engine is configured to form an inclined vortex including a tumble component and swirl component produced in the combustion chamber and wherein the injection timing in executing the divided fuel injection in the compression stroke is determined to catch the later injected fuel by the cavity formed on the top of the piston.

6. A direct injection engine as recited in claim 5 wherein the divided fuel injection is executed in the high engine load zone of an engine operating zone for accomplishing the stratified combustion, wherein a lump sum fuel injection is executed in the low engine load zone, and wherein a later fuel injection start timing in the divided fuel injection is determined to be substantially the same timing as a fuel injection start timing in the case of the lump sum injection in substantially the same engine speed condition.

7. A direct injection engine as recited in claim 6 wherein a fuel injection pressure is increased compared with a relatively low engine load and speed where the engine is in the relatively high engine load and speed in the operating zone in which the divided fuel injection is executed in the compression stroke.

8. A direct injection engine as recited in claim 7 wherein an earlier fuel injection timing is advanced compared with a steady engine operating condition where the engine is in an accelerated condition in the engine operating zone in which the divided fuel injection is executed in the compression stroke and wherein an earlier fuel injection amount is greater than the later fuel injection amount.

9. A direct injection engine as recited in claim 8 wherein the later fuel injection amount is determined to be approximately 30–80% of a total fuel injection amount in the engine operating zone in which the divided fuel injection is executed in the compression stroke.

10. A direct injection engine as recited in claim 9 wherein the later fuel injection amount is not smaller than the earlier fuel injection amount at least in a relatively low engine load zone in the engine operating zone in which the divided fuel injection is executed in the compression stroke.

11. A direct injection engine as recited in claim 9 wherein the later fuel injection amount is approximately 50–80% of the total injection amount where EGR gas is recirculated from an exhaust system to an intake system in the engine operating condition in which the divided fuel injection is executed in the compression stroke.

12. A direct injection engine as recited in claim 11 wherein a ratio of the earlier fuel injection amount to the later fuel injection amount is changed in accordance with the engine operating condition in the operating zone in which the divided fuel injection is executed in the compression stroke.

13. A direct injection engine as recited in claim 12 wherein the earlier fuel injection amount is increased as the engine load in increased in the operating zone in which the divided fuel injection is executed in the compression stroke thereby controlling the total fuel injection amount to match the engine load.

14. A direct injection engine as recited in claim 13 wherein the earlier fuel injection start timing is advanced and the earlier fuel injection amount is increased compared with a relatively low engine load or low engine speed zone when the engine operating condition is in a relatively high engine load and speed zone in the engine operating zone in which the divided fuel injection is executed in the compression stroke.

15. A direct injection engine as recited in claim 14 wherein the start timings of the earlier and later fuel injections are advanced as the engine load is increased when the engine is at least in a relatively low engine speed zone in the engine operating condition in which the divided fuel injection is executed in the compression stroke.

16. A direct injection engine as recited in claim 15 wherein the start timings of the earlier and later fuel injections are advanced as the engine speed is increased when the engine is in the engine operating condition in which the divided fuel injection is executed in the compression stroke.

17. A direct injection engine as recited in claim 16 wherein an advancement of the injection timing in accordance with the engine speed for the earlier fuel injection is greater than that for the later fuel injection.

18. A direct injection engine as recited in claim 14 wherein the advancement in the injection timing of the earlier fuel injection based on an increase of the engine load or the engine speed is limited where the engine is in a relatively high engine load and speed zone in the operating zone in which the divided injection is executed in the compression stroke.

19. A direct injection engine as recited in claim 18 wherein an interval between the earlier fuel injection and the later fuel injection is increased as the engine load is increased when the engine is in a relatively low engine speed zone in the operating zone in which the divided injection is executed in the compression stroke.

20. A direct injection engine as recited in claim 19 wherein the interval between the injection start timings of the earlier and later fuel injections is substantially constant regardless of the engine load change when the engine is in a relatively high engine speed zone in the operating zone in which the divided injection is executed in the compression stroke.

21. A direct injection engine as recited in claim 20 wherein the interval between the earlier injection start timing and the later injection start timing is more than about 2 ms in the engine operating zone in which the divided injection is executed in the compression stroke.

22. A direct injection engine as recited in claim 21 wherein a fuel injection time period is set within about 1 msec in the engine operating zone in which the divided injection is executed in the compression stroke.

23. A direct injection engine as recited in claim 22 wherein, when the engine is in a warmed up condition, the fuel injection is executed plural times in the compression stroke in an operating zone in which at least one of the engine load and engine speed is relatively high for accomplishing the stratified combustion, and wherein the fuel injection is executed plural times when the engine is in a warming up condition in a manner that the fuel injection is made in the intake stroke and the compression stroke respectively.

* * * * *